UNITED STATES PATENT OFFICE 2,007,241

PURIFICATION OF MUSK-AMBRETTE

Miles A. Dahlen, Wilmington, Del., and Walter V. Wirth, Woodstown, N. J., assignors to E. I. du Pont de Nemours & Company, Wilmington, Del., a corporation of Delaware No Drawing. Application March 1, 1934, Serial No. 713,522

13 Claims. (Cl. 260—143)

This invention relates to the manufacture of perfume chemicals. More particularly, it relates to an improved process for the purification of musk-ambrette.

Musk-ambrette, an important fixative in the perfume art, is generally prepared by nitrating tertiary-butyl-3-methoxy-1-toluene. The structure of the final compound is believed in the art to correspond to the following formula

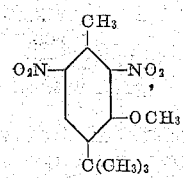

(2,6-dinitro-4-tert-butyl-3-methoxy-toluene; Zeide and Dubinin, Jour. of Gen. Chem.— U. S. S. R.—vol. 2, pages 455–471.

During the nitration, however, there is also formed 4,6-dinitro-3-methoxy-toluene.

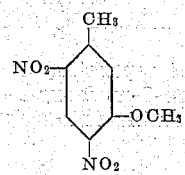

in considerable amounts, the butyl group being replaced by a nitro group. Small quantities of mono-nitro compounds and oxidation products are also formed in the nitration processes.

4,6-dinitro-3-methoxy-toluene is a pale yellow crystalline solid, melting at 101° C.

The present application is concerned with a process for separating the nitration mass into its components, whereby to obtain each of the two main constituents in a highly pure form, and substantially free of the other constituent. It is a further object of this invention to improve the economy of the separation process. Other and further important objects of this invention will appear as the description proceeds.

According to the methods previously described for the isolation and purification of musk-ambrette, the crude nitration product was subjected to fractional crystallization from alcohol or benzene. Such a procedure is described by Knoll and Wagner on page 227 of Synthetische und Isolierte Riechstoffe (Zweite Auflage, Verlag vom Wilhelm Knapp) Halle, Germany, 1928. This process, however, suffers from the drawback that both musk-ambrette and dinitro-methoxy-toluene are highly soluble in either alcohol or benzene. The separation is therefore incomplete, and the loss of the valuable product in the mother liquor is rather high.

Zeide and Dubinin (ibid) have shown that musk-ambrette may be separated from dinitro-methoxy-toluene by fractional distillation, since the former boils at 185° C. under 16 mm. pressure while the latter boils 202—3° C. under the same conditions. This method, however, has the disadvantage that the boiling point of dinitro-methoxy-toluene is too high to allow it to be distilled in simple and economically operated distillation equipment. It may be left as a still residue, but if it is desired as an intermediate for other useful compounds, it must be put through special purification steps.

Now, according to our improved process, we separate the musk-ambrette from its by-products by subjecting the crude mass to an extraction treatment with an organic liquid. We found that liquid non-aromatic hydrocarbons, such as the paraffins, olefines, and cycloparaffins form excellent solvents for musk-ambrette, while being substantially non-solvents for dinitro-3-methoxy-toluene. The effect is rather surprising in view of the fact that solid aromatic nitro compounds in general are notorious for their poor solubility in aliphatic hydrocarbons. It was therefore not to be expected that non-aromatic hydrocarbons could be found whose solubility for the two main constituents of the nitration product herein considered would differ so widely as to afford a means of separation by the simple process of extraction.

Extraction differs from fractional crystallization in that the entire crude mass does not have to be brought in solution prior to separation. In our extraction process a high-quality solution of musk-ambrette, on the one hand, and substantially pure dinitro-methoxy-toluene, on the other hand, are obtained in one step by merely agitating the crude solid mass with a solvent as above mentioned. In fractional crystallization, however, complete solution of the crude mass is necessary first. From this, the bulk of musk-ambrette is crystallized out; the mother liquor, however, contains a mixture of residual musk-ambrette and the debutylated by-product, which can be separated from each other only by further, laborious procedures.

Accordingly, our improved process consists of agitating the filtered nitration mass with a non-aromatic hydrocarbon, for instance petroleum naphtha, in quantity sufficient to dissolve the musk-ambrette present in the mixture. The dinitro-methoxy-toluene mostly stays behind as a solid, and only a very small quantity thereof goes into solution. The bulk of the dinitro-methoxy-toluene may, therefore, be removed by filtration, and washed in the usual manner, whereby it is obtained in a state of purity sufficient for most practical purposes.

The mother liquor is then either concentrated to crystallize out musk-ambrette in a high state of purity, or evaporated to dryness. In the latter case the residue still contains small quantities of dinitro-methoxy-toluene and other by-products of the nitration. It may be purified finally by any suitable procedure, such as distillation, or recrystallization from alcohol, benzene, or an aliphatic hydrocarbon. Since the dinitro-methoxy-toluene content of this residue is very small, the crystallization may be carried out in very concentrated solution and the loss of material in the filtrate is very small.

Without limiting our invention to any particular procedure, the following examples, in which parts by weight are given, will serve to illustrate our preferred mode of operation.

*Example I*

243 parts of the solid nitration mass obtained in the nitration of tertiary-butyl-3-methoxy-1-toluene, (for instance by the aid of fuming nitric acid in a medium of acetic anhydride) were added to 1000 parts of petroleum naphtha, having a boiling range of 70 to 100° C. The mass was heated, and stirred at 70° C. for about ½ hour. The mass was then cooled to 40° C., filtered, and the filter cake washed with 50 parts of naphtha.

The filter cake, constituting substantially pure dinitro-3-methoxy-1-toluene, was dried at 80° C. The yield was 47.5 parts, and its melting point was 96 to 98° C.

The mother liquor was heated to 95° C. to boil off the naphtha, first at atmospheric pressure and then at 50–60 mm. of mercury, absolute. The residue contained 196 parts of musk-ambrette, melting at 80° C.

This material was then crystallized twice from alcohol to give a product melting at 85° C.

From the mother liquors of the alcohol crystallization further quantities of musk-ambrette may be recovered by evaporation, and adding the mixed residue to a subsequent batch of the nitration product to be fractionated.

*Example II*

The procedure of Example I was followed down to the point where the dinitro-methoxy-toluene was removed by filtration, and the mother liquor evaporated to give 196 parts of crude musk-ambrette. This product was then fractionally distilled under an absolute pressure of about 2 mm. The musk-ambrette distilled over at 137° to 139° C. About 183 parts of musk were obtained, melting at 82° C. This was crystallized once from 455 parts of alcohol, and gave a product melting at 85° C.

*Example III*

A suitable kettle was charged with 425 parts of cyclohexane and 100 parts of dry "crude musk", that is, the crude mixture of solids as obtained in the nitration of tert-butyl-3-methoxy-1-toluene. The charge was heated to 70° C. and stirred at this temperature for about ½ hour. The temperature was then lowered to 40° C. and the undissolved 2,6-dinitro-3-methoxy-toluene was separated from the musk solution in a centrifuge as described in Example I. The process of this example was then followed, giving essentially the same results as recorded above.

It will be understood that the process is subject to variations in the nature and amount of the extracting liquid used, temperatures involved, etc. Thus, instead of petroleum naphtha, any other light petroleum fraction, for instance kerosene or ligroin, may be employed; or again, any individual non-aromatic hydrocarbon or mixture of such hydrocarbons may be used, for instance, the liquid members of the paraffine family (hexane, heptane, octane, etc.); the aliphatic unsaturated hydrocarbons (hexene, heptene, octene, hexadiene, octine, etc.); or the cycloparaffines (cyclohexane, methyl-cyclohexane, methyl-cycloheptane, cyclohexene, decalin, etc.).

The musk-ambrette can be crystallized directly from the naphtha solution and then from alcohol or any other suitable solvent. The naphtha can be removed from the naphtha-musk solution by steam distillation and the residual musk can be distilled over with superheated steam, before final crystallization from a suitable solvent.

Many other variations and modifications will be apparent to those skilled in the art.

It will be clear now that our process provides an improved and efficient method for separating the constituents obtained in the nitration of tertiary-butyl-3-methoxy-1-toluene, and possesses the following advantages over the prior practice.

1. An almost complete recovery of the pure musk may be effected in a simple manner, whereas according to the prior art, large losses of musk are incurred.

2. The by-product dinitro-3-methoxy-1-toluene may be recovered readily and in good purity.

3. Very cheap hydrocarbon solvents—such as petroleum fractions—may be used for the preliminary separation of musk from dinitro-3-methoxy-1-toluene.

4. The separation and purification operations are readily carried out in simple equipment, and the recovery of solvents is likewise readily effected.

5. The cost of separating and purifying the musk and dinitro-3-methoxy-1-toluene is much lower than is possible following the methods of the prior art.

We claim:

1. The process for recovering musk-ambrette from the crude nitration mass in which it is formed, which comprises subjecting the crude solid mass to extraction by means of a solvent consisting predominantly of a non-aromatic liquid hydrocarbon.

2. The process for recovering musk-ambrette from the crude nitration mass in which it is formed, which comprises subjecting the crude solid mass to extraction by means of a solvent consisting predominantly of liquid hydrocarbons of the group consisting of the paraffins, cycloparaffins, and unsaturated aliphatic hydrocarbons.

3. A process for separating dinitro-3-methoxy-1-toluene and musk-ambrette from a mixture containing the two, which comprises extracting the solid mixture by the aid of a solvent comprising as a major ingredient an aliphatic liquid hydrocarbon.

4. A process for separating dinitro-3-methoxy-1-toluene and musk-ambrette from a mixture containing the two, which comprises heating the mixture in a liquid aliphatic hydrocarbon to dissolve the musk-ambrette, and separating the insoluble dinitro-3-methoxy-1-toluene.

5. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, and recovering musk-ambrette from the mother liquor.

6. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, and concentrating the mother liquor to crystallize out musk-ambrette.

7. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, and evaporating the mother liquor to dryness.

8. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, evaporating the mother liquor to dryness, and subjecting the residue thus obtained to further purification.

9. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, evaporating the mother liquor to dryness, and subjecting the residue thus obtained to fractional distillation under a vacuum.

10. A process for recovering musk-ambrette from the solid nitration mass obtained by nitrating tertiary-butyl-3-methoxy-1-toluene, which comprises heating said nitration mass in a liquid petroleum fraction until the musk has gone into solution, filtering off the insoluble residue, evaporating the mother liquor to dryness, and subjecting the residue thus obtained to recrystallization from a solvent.

11. The process of recovering musk-ambrette from the mixture of nitration products obtainable by reacting with fuming nitric acid in the presence of acetic anhydride upon tertiary-butyl-3-methoxy-1-toluene, which comprises heating the mixture of solids obtained in said nitration in petroleum naphtha to a temperature substantially near the boiling point, filtering off the undissolved residue, and evaporating the mother liquor to dryness.

12. The process of recovering musk-ambrette from the mixture of nitration products obtainable by reacting with fuming nitric acid in the presence of acetic anhydride upon tertiary-butyl-3-methoxy-1-toluene, which comprises heating the mixture of solids obtained in said nitration in petroleum naphtha to a temperature substantially near the boiling point, filtering off the undissolved residue, evaporating the mother liquor to dryness, and subjecting the residue thus obtained to recrystallization from alcohol.

13. The process of recovering musk-ambrette from the mixture of nitration products obtainable by reacting with fuming nitric acid in the presence of acetic anhydride upon tertiary-butyl-3-methoxy-1-toluene, which comprises heating the mixture of solids obtained in said nitration in petroleum naphtha to a temperature substantially near the boiling point, filtering off the undissolved residue, evaporating the mother liquor to dryness, subjecting the residue thus obtained to fractional distillation under a vacuum, and collecting the fraction boiling at 137 to 139° C. under an absolute pressure of 2 mm.

MILES A. DAHLEN.
WALTER V. WIRTH.